(12) United States Patent
Ling (10) Patent No.: US 10,322,616 B2
(45) Date of Patent: Jun. 18, 2019

(54) VEHICULAR REFRIGERATOR SYSTEM

(71) Applicant: Perpetual V2G Systems Limited, Carmarthenshire (GB)

(72) Inventor: Andrew Ling, Carmarthenshire (GB)

(73) Assignee: Perpetual V2G Systems Limited, Lampeter, Carmarthenshire (GB)

( * ) Notice: Subject to any disclaimer, the term of this patent is extended or adjusted under 35 U.S.C. 154(b) by 119 days.

(21) Appl. No.: 15/115,239

(22) PCT Filed: Sep. 16, 2014

(86) PCT No.: PCT/GB2014/052805
§ 371 (c)(1),
(2) Date: Jul. 28, 2016

(87) PCT Pub. No.: WO2015/114287
PCT Pub. Date: Aug. 6, 2015

(65) Prior Publication Data
US 2017/0210194 A1    Jul. 27, 2017

(30) Foreign Application Priority Data

Jan. 29, 2014 (GB) .................................. 1401509.3

(51) Int. Cl.
*B60P 3/20* (2006.01)
*B60H 1/00* (2006.01)
(Continued)

(52) U.S. Cl.
CPC ..... *B60H 1/00014* (2013.01); *B60H 1/00428* (2013.01); *B60L 11/1809* (2013.01);
(Continued)

(58) Field of Classification Search
CPC ........ B60R 16/04; B60P 3/20; H01M 10/441; H01M 10/482
See application file for complete search history.

(56) References Cited

U.S. PATENT DOCUMENTS 2,677,246 A    5/1954  Wehby
8,295,950 B1 * 10/2012  Wordsworth ...... B60H 1/00428
                                          307/86
(Continued)

FOREIGN PATENT DOCUMENTS

CN    102745040 A    10/2012
FR    2 816 699 A1   11/2000
(Continued)

OTHER PUBLICATIONS

English Translation of CN102745040A, 11 pp.
(Continued)

*Primary Examiner* — James A English
(74) *Attorney, Agent, or Firm* — James A. Sheridan; Sheridan Law, LLC (57) ABSTRACT

There is provided a commercial refrigerator vehicle for the transport of refrigerated produce, the commercial refrigerator vehicle comprising a wheeled chassis, a cab, an internal combustion engine, a refrigerator compartment on the wheeled chassis, and a refrigerator system for controlling interior temperature of the refrigerator compartment. The refrigerator system includes a refrigerator unit, a dedicated rechargeable electrical energy storage device housed in the cab, a vehicle battery pack chargeable directly or indirectly via the internal combustion engine and a charger for the electrical energy storage device. The charger preferably includes a controller for monitoring an activation status of the internal combustion engine and electrically disconnects the vehicle battery pack from the dedicated rechargeable electrical energy storage device when the internal combustion engine is deactivated. There is further provided a method of charging the refrigerator system via the electrical energy storage device.

11 Claims, 4 Drawing Sheets

(51) Int. Cl.
- B60R 16/033 (2006.01)
- H01M 10/0525 (2010.01)
- H01M 10/44 (2006.01)
- H01M 10/48 (2006.01)
- H01M 2/10 (2006.01)
- B60R 16/04 (2006.01)
- B60L 11/18 (2006.01)
- H01M 10/46 (2006.01)

(52) U.S. Cl.
CPC ............ *B60L 11/1861* (2013.01); *B60P 3/20* (2013.01); *B60R 16/033* (2013.01); *B60R 16/04* (2013.01); *H01M 2/1077* (2013.01); *H01M 10/0525* (2013.01); *H01M 10/441* (2013.01); *H01M 10/46* (2013.01); *H01M 10/482* (2013.01); *H01M 10/488* (2013.01); *H01M 2220/20* (2013.01); *Y02T 10/7011* (2013.01); *Y02T 10/88* (2013.01)

(56) References Cited

U.S. PATENT DOCUMENTS

| | | | |
|---|---|---|---|
| 2008/0034773 A1 | 2/2008 | Karapetian | |
| 2009/0314019 A1* | 12/2009 | Fujimoto | B60H 1/3222 62/228.5 |
| 2013/0168177 A1* | 7/2013 | Takagi | B60K 1/04 180/291 |
| 2014/0284125 A1* | 9/2014 | Katayama | B60K 1/04 180/68.5 |
| 2015/0168032 A1* | 6/2015 | Steele | B60P 3/20 62/61 |
| 2015/0188360 A1* | 7/2015 | Doane | H02J 7/35 307/9.1 |
| 2015/0321539 A1* | 11/2015 | Mohs | B60P 3/20 62/115 |

FOREIGN PATENT DOCUMENTS

| | | | | |
|---|---|---|---|---|
| GB | 2 408 792 A | | 11/2004 | |
| WO | WO-2013073464 A1 | * | 5/2013 | ............... B60K 1/04 |

OTHER PUBLICATIONS

English Translation of Fr 2816699, 7 pp.
European Search Report for Application No. GB1401509.3, dated Aug. 28, 2014, 2 pp.
Written Opinion of the International Searching Authority for Application No. PCT/GB2014/052805, 16 pp.
International Search Report for Application No. PCT/GB2014/052805, dated Sep. 9, 2015, 6 pp.
European Examination Report for 14 787 010.0, dated Nov. 16, 2016, 9 pp.

\* cited by examiner

VEHICULAR REFRIGERATOR SYSTEM

The present invention relates to a commercial refrigerator vehicle for transporting and/or storing refrigerated goods. The refrigeration unit of the vehicle is powerable by electrical energy from a power source which is not the main engine of the vehicle. The invention further relates to a method of powering a refrigerator system for such a vehicle, and a method of monitoring the charge status of the refrigerator system.

Many goods must be transported under refrigeration in order to prevent spoilage, and therefore mobile refrigerator vehicles must be provided for this purpose. Such vehicles are widely used to transport groceries and pharmaceutical products.

Unfortunately, refrigeration is an energy-intensive process. Typically, the electricity required to refrigerate a cold compartment of the vehicle is generated via the main engine, usually by powering an electrical generator. This means that in order to power the refrigerator system, the main engine must be constantly operational.

Having a constantly operational main engine, even when the vehicle is not in motion, leads to a large increase in fuel consumption and waste gas emission. As such, the vehicle requires more fuel than necessary to transport the goods a given distance, increasing the weight of the vehicle, thus further reducing fuel efficiency.

The present invention seeks to overcome all of these problems, by providing a refrigerator system which is powered by a battery system, rather than by the main engine of the vehicle.

According to a first aspect of the invention, there is provided a commercial refrigerator vehicle for the transport of refrigerated produce, the commercial refrigerator vehicle comprising a wheeled chassis, a cab mounted on the wheeled chassis, an internal combustion engine having an output for driving one or more wheels of the wheeled chassis, a refrigerator compartment on the wheeled chassis for the storage of produce to be refrigerated, and a refrigerator system for controlling interior temperature of the refrigerator compartment, the refrigerator system including a refrigeration unit for discharging refrigerated air into the refrigerator compartment, a dedicated rechargeable electrical energy storage device for supplying electrical energy to the refrigerator system, a vehicle battery pack chargeable directly or indirectly via the internal combustion engine, a charger for charging the dedicated rechargeable electrical energy storage device via the vehicle battery pack, and a controller for monitoring an activation status of the internal combustion engine and electrically disconnecting the vehicle battery pack from the dedicated rechargeable electrical energy storage device when the internal combustion engine is deactivated.

By separating the source of the power providing the motive force to the wheels of the vehicle, in other words, the internal combustion engine, from the source of the power of the refrigeration unit, being in this case the electrical energy storage device, the refrigeration of the refrigerator compartment is decoupled from the activation of the internal combustion engine. As such, the refrigeration unit can operate without the internal combustion engine having to be active; therefore, when the vehicle is stationary, the internal combustion engine can be deactivated without compromising the refrigeration.

The ability to deactivate the internal combustion engine when stationary or parked, as would be the case for a non-refrigerated vehicle, yields a reduction in fuel consumption and waste gas emission. This makes for a more energy efficient refrigerator vehicle than could otherwise be achieved.

Furthermore, in present generation refrigerator vehicles, the internal combustion engine is much larger and heavier than would otherwise be required, since the refrigeration unit must also be powered by the internal combustion engine, thereby requiring greater capacity. The electrical energy storage device weighs considerably less than the excess weight that would be required to sufficiently increase the power output of the internal combustion engine, and therefore installation of the electrical energy storage device leads to a reduction in gross weight of the vehicle. This means that either the vehicle is lighter and therefore more fuel efficient, or the extra weight can be used to install a larger fuel tank, thereby increasing the range of the vehicle.

Additionally, the driver of the vehicle is not required to leave the internal combustion engine running whilst making deliveries. Leaving the engine running requires the ignition key to remain in the vehicle; therefore, there is a greater risk of the vehicle being stolen whilst the driver is making deliveries. If the refrigeration unit is active regardless of the state of the internal combustion engine, then the driver is free to remove the key and lock the vehicle.

Preferably, the electrical energy storage device may be positioned within the cab. Furthermore, the electrical energy storage device may be positioned adjacent a seat for the driver when driving the vehicle. More preferably, the electrical energy storage device is positioned underneath a passenger seat of the cab. Preferably, but alternatively the electrical energy storage device may replace a passenger seat of the cab.

Rather than positioning the electrical energy storage device such that it takes up valuable space within the refrigerator compartment, it is preferable to use space within the cabin. Typically, the driver of the refrigerator vehicle will be the only occupant; therefore, the passenger seat is wasted space. As such, the electrical energy storage device should either be inserted into a space below the passenger seat, or replace the passenger seat entirely.

Preferably access to the electrical energy storage device may be provided through a cab door of a passenger side of the cab. Alternatively, access to the electrical energy storage device may be provided underneath the cab, or from the rear of the cab.

It is advantageous to provide easy access to the electrical energy storage device. Since, the device will typically be a battery, the quickest way of recharging it will be via connection to a mains electricity supply, which is most readily achieved through some form of access portion to the battery.

Preferably, the controller may monitor a charge status of the electrical energy storage device. The controller may then supplementarily drive the refrigeration unit via a vehicle battery pack if the charge status of the electrical energy storage device is determined to be below a predetermined threshold.

It is advantageous to monitor the charge status of the electrical energy storage device, since the driver can be alerted if he will need to recharge it prior to making further deliveries. However, if the electrical energy storage device becomes depleted at an inconvenient time, then refrigeration can be maintained by diverting power from a main battery pack of the vehicle in the interim period.

Preferably the controller may monitor a charge status of the vehicle battery pack. The controller may then prevent the vehicle battery pack from driving the refrigeration unit if the charge status of the vehicle battery pack falls below a predetermined threshold required to start the internal combustion engine.

It is also advantageous to monitor the charge status of the vehicle battery pack. If its charge drops below a certain threshold, then it may not be possible to start the internal combustion engine of the vehicle. In such a situation, refrigeration becomes a secondary concern.

Preferably, the controller may further include a wireless transmitter, and the wireless transmitter may be capable of transmitting a signal to a remote device. The transmitted signal may preferably contain information relating to the charge status of the electrical energy storage device.

Furthermore, the remote device is preferably a smartphone or other suitable mobile telecommunications device, which in either case has a software-based computer implemented application or device for displaying the remaining period of charge of the electrical energy storage device.

If the controller includes a wireless transmitter which is capable of transmitting the information regarding the charge status of the electrical energy storage device, then a remote device such as a smartphone may be configured, for instance via a computer executable application, to receive and display the information to the driver. This advantageously allows the driver to monitor the charge level within the electrical energy storage device when he is making deliveries.

Preferably, the controller may be capable of activating and deactivating the refrigerator system independently of the temperature of the refrigeration unit to reduce the power consumption of the refrigerator system.

Intermittent activation and deactivation of the refrigerator system will reduce the power consumption of the vehicle whilst utilising the residual cooling effect inherent within the refrigerator system, enabling it to make more deliveries on a single battery charge. Since the refrigerator compartment is thermally insulated, there will be minimal temperature increase of the compartment during short periodic deactivation periods, typically of 5 to 10 minutes.

Preferably, the electrical energy storage device may comprise at least one rechargeable battery, and the or each rechargeable battery may preferably be a Lithium ion cell.

It may be preferable to provide a plurality of rechargeable batteries, configured such that one battery may export power to the refrigeration unit, whilst the or each remaining battery is charged. If the controller is capable of monitoring the charge status of the electrical energy storage device, then it may be preferable to monitor the charge status of the or each rechargeable battery within the electrical energy storage device.

Preferably, the controller may determine which battery is to be used to export power to the refrigeration unit based on the charge status of the or each battery.

Batteries are the most common electrical energy storage devices, and are therefore the most appropriate for use in as vehicle as presented. The advantage of using a plurality of batteries is that whilst one battery is providing power to the refrigeration unit, the other batteries can be simultaneously recharged, thereby extending the operational lifetime of the vehicle.

The charger may be a charge separator associated with an electrical output of the internal combustion engine of the vehicle. The charge separator may preferably charge the electrical energy storage device using excess electrical energy generated during normal operation of the internal combustion engine of the vehicle.

Beneficially, the electrical energy storage device may be supplementarily chargeable from a mains electricity supply.

A rechargeable power source is highly appropriate for a refrigerator vehicle, since it will be making multiple short journeys, such as deliveries, before returning to a central location, typically being a depot. This offers a perfect opportunity to recharge the or each electrical energy storage device for the next outing.

There may preferably be further provided a display means in the cab for relaying information about at least one of the energy consumption, remaining charge or charging time of the electrical energy storage device to the driver of the vehicle.

It is advantageous to also provide information regarding the charge status to the driver in the cab, since the electrical energy storage device may deplete whilst driving, which would indicate that the vehicle should be returned to the depot.

Preferably, the refrigerator compartment may be subdivided into multiple compartments of differing temperature, the refrigerator system being capable of simultaneously refrigerating the individual refrigerator compartments.

Most grocery vehicles have separate compartments for chilled and frozen goods, so it is advantageous to provide separate compartments for these separate functions.

Preferably, the wheeled chassis may be supplied as a single rigid unit. Alternatively, however, the wheeled chassis may be supplied as an articulated chassis, comprising a tractor unit and a trailer unit, the tractor unit including the cab, the internal combustion engine, the electrical energy storage device, the vehicle battery pack and the charger, and the trailer unit including the refrigerator compartment and the refrigeration unit.

Depending upon the scale of goods to be transported, it may be advantageous to provide a refrigerator lorry, generally used for deliveries to residential properties, or a larger articulated refrigerator vehicle, more useful for bulk transport of goods, for instance, from a warehouse to a retail outlet.

According to a second aspect of the invention, there is provided a method of powering a refrigerator system of a commercial refrigerator vehicle for transportation and/or storage of refrigerated goods, the method comprising the steps of: a] onboard charging a dedicated rechargeable electrical energy storage device in electrical communication with a battery pack of the vehicle which is chargeable directly or indirectly by an internal combustion engine of the vehicle, and electronically monitoring an activation status of the internal combustion engine; b] electrically powering a refrigeration unit of the vehicle using the electrical energy storage device, irrespective of the activation status of the internal combustion engine of the vehicle; and c] automatically electrically disconnecting the vehicle battery pack from the electrical energy storage device, when it is determined that the internal combustion engine is deactivated.

Preferably, during step a], the electrical energy storage device is preferentially charged by a mains electricity supply.

Preferably, the method may further comprise step: d] automatically switching an electricity supply to drive the refrigeration unit to the vehicle battery pack, if the charge status of the electrical energy storage device falls below a predetermined threshold.

Preferably, the method may further comprise step: e] monitoring a charge status of the vehicle battery pack, and electrically disconnecting the vehicle battery pack from driving the refrigeration unit if the charge status of the vehicle battery pack falls below a predetermined threshold required to start the internal combustion engine.

The method of providing the power for the refrigeration unit from the electrical energy storage device is advantageous as it decouples the refrigeration properties of the vehicle from the activation of the internal combustion engine. Therefore, the refrigeration unit can operate even if the vehicle is stationary or parked.

It is also advantageous to provide a means of powering the refrigeration unit, should the charge of the electrical energy supply means be depleted, since this will prevent a rise in the temperature of the refrigerator compartment, spoilage of the chilled goods will not ensue.

According to a third aspect of the invention, there is provided a method of monitoring the charge status of a refrigerator system powered in accordance with the second aspect of the invention, the method comprising the steps of: a] monitoring a charge status of the electrical energy storage device; b] wirelessly transmitting the charge status to a remote device carriable by a vehicle operator; and c] displaying an electrical energy storage device status on a screen of the remote device.

By transmission of the charge status of the electrical energy storage device to a remote device, the driver can monitor whether or not he needs to return to the vehicle sooner than expected in order to prevent a shutdown of the refrigeration unit.

The invention will now be more particularly described, by way of example only, with reference to the accompanying drawings, in which:

FIG. 4 shows a top plan view of a second embodiment of a commercial refrigerator vehicle, in accordance with the first aspect of the invention.

Figure 1:
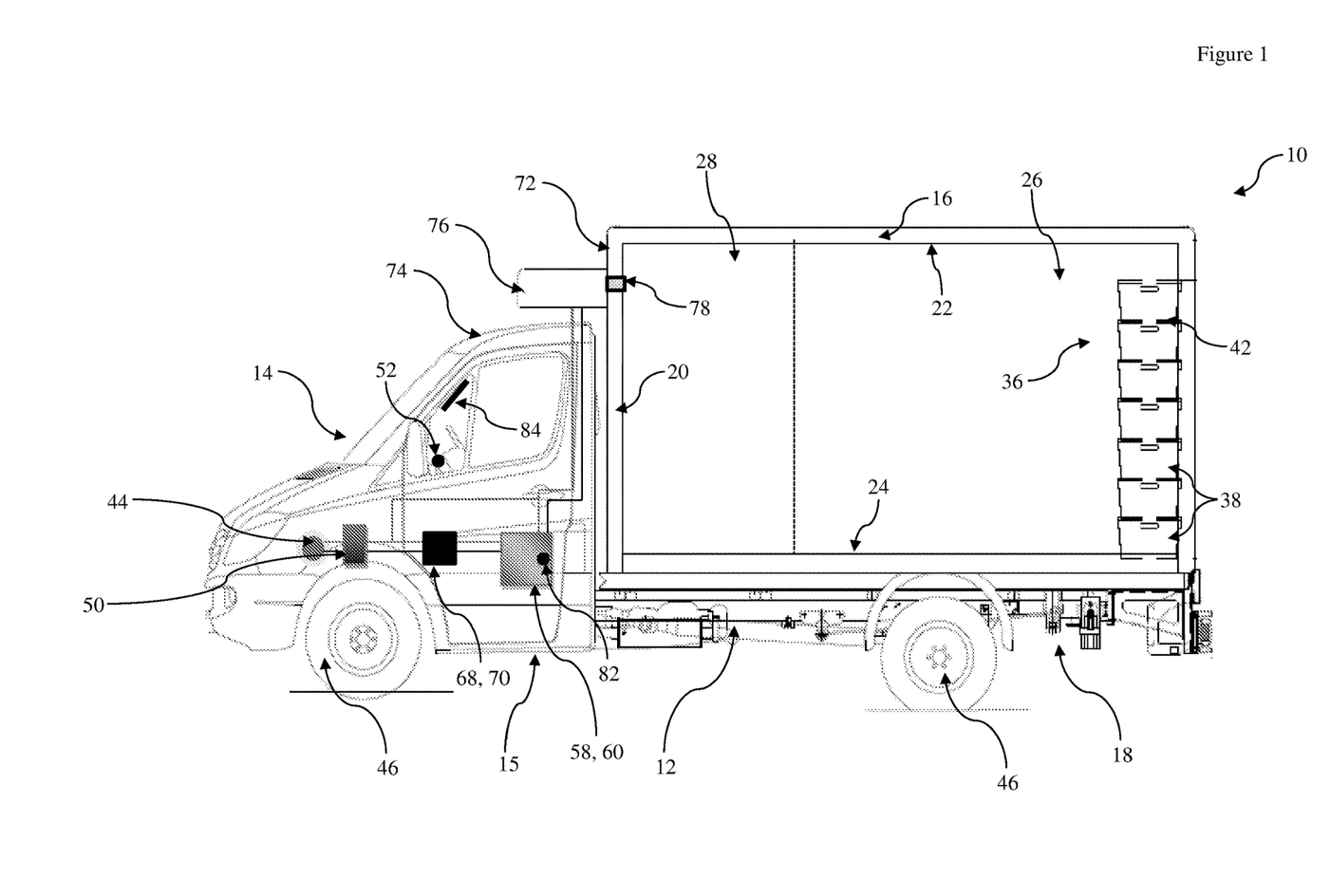
FIG. 1 shows a side, partial cross-sectional view of a first embodiment of a commercial refrigerator vehicle, in accordance with the first aspect of the invention.
Figure 2:
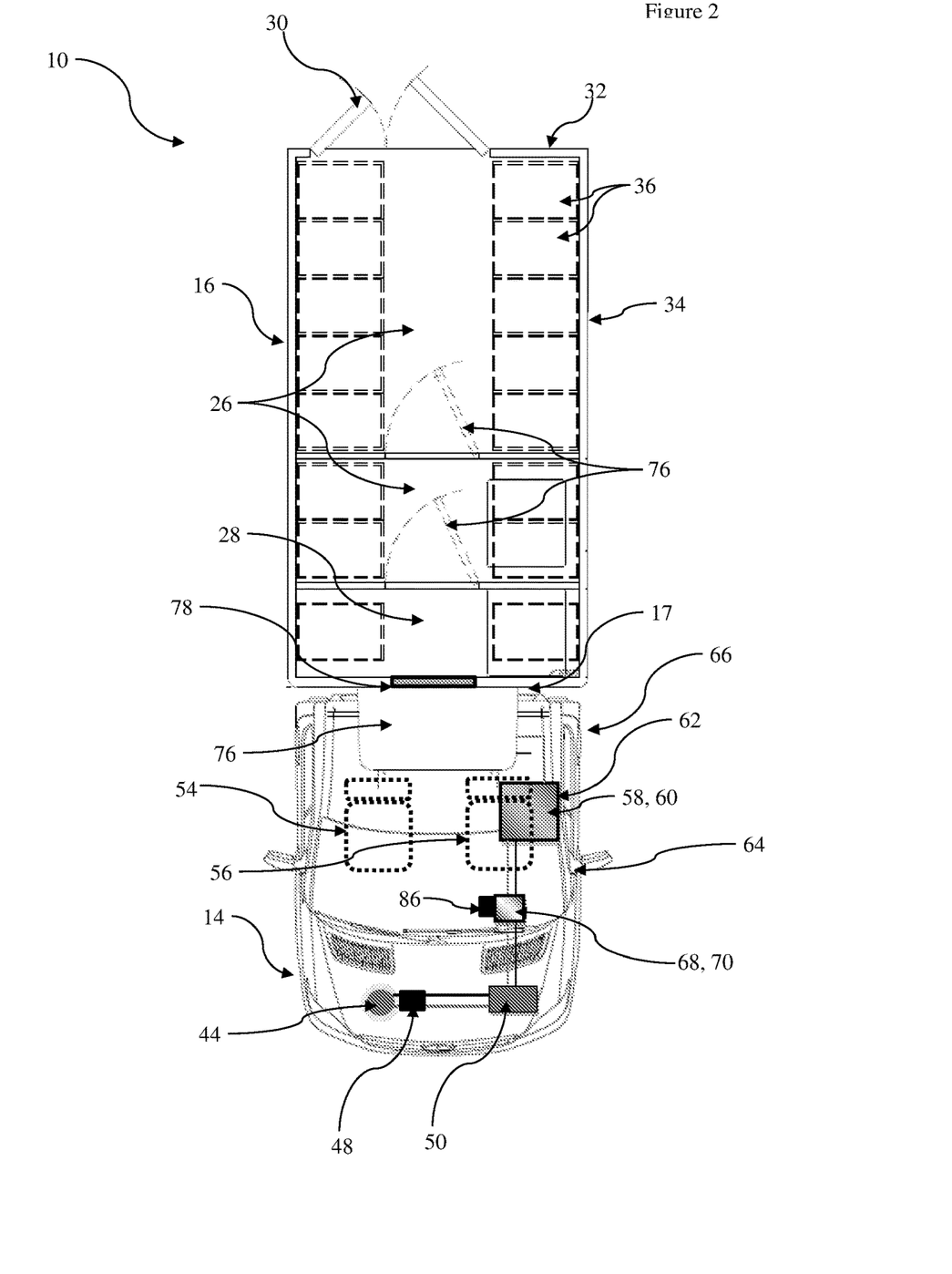
FIG. 2 shows a top plan view of the commercial refrigerator vehicle, shown in FIG. 1.

With reference firstly to FIGS. 1 and 2 of the drawings, there is shown globally a first embodiment of a commercial refrigerator vehicle 10 comprising a wheeled chassis 12 having a cab 14 positioned forwardly on the chassis 12 and a refrigerator compartment 16 located to the rear 18 of the chassis 12. The refrigerator compartment is a closed cuboidal region having insulated walls 20, roof 22 and base 24.

The refrigerator compartment 16 is typically sub-divided into at least two sub-compartments; a cool compartment 26 which is refrigerated to around 1 to 5 degrees C., and a frozen compartment 28 which is chilled to around −15 to −20 degrees C. The refrigerator compartment 16 is accessible via at least one compartment door 30 located at the rear 32 or side 34 of the vehicle, and will contain at least one storage means 36 for containers 38 of the refrigerated goods. Any sub-compartments 26, 28 of the refrigerator compartment 16 may also be interconnected by intercompartmental doors 40. Where the vehicle 10 is a grocery delivery vehicle, the storage means 36 will typically be shelves 42 into which containers 38 can be stacked.

Forwardly on or within the chassis 12 is mounted an internal combustion engine 44 which has an output for providing the motive power for driving the vehicle 10 via the wheels 46. The internal combustion engine 44 is associated with an alternator 48, which in turn provides electrical power to a vehicle battery pack 50. The vehicle battery pack 50 provides electrical power to many of the standard electrical components of the vehicle 10, most notably the spark or glow plugs used to start the internal combustion engine 44. The internal combustion engine 44 is activatable from within the cab 14 by using an ignition means 52, usually a key. The internal combustion engine is typically a compression-ignition engine, but may be a spark-ignition engine.

Within the cab 14 is located a driver seat 54, from which a driver can operate the vehicle 10, and a passenger seat 56 adjacent the driver seat 54. Underneath the passenger seat 56 is located a dedicated rechargeable electrical energy storage device 58, in this case being a single rechargeable battery cell 60 preferably utilising one or more Lithium ion cells. The electrical energy storage device 58 is accessible via an access point 62. Through the access point 62 the electrical energy storage device 58 can be either removed, or connected to a mains electricity supply for recharging. Recharging of the electrical energy storage device 58 may be achieved by providing the electrical energy storage device 58 with an electrical connector engagable with an external power cable electrically communicable with the mains electricity supply.

The access point 62 would typically be accessible through a cab door 64 on the passenger side 66 of the cab 14. However, the electrical energy storage device 58 may be recessed below a floor 15 of the cab 14, with the access point 62 being a panel provided in the floor for access to the electrical energy storage device 58. Alternatively, the access point 62 may be a panel located in a rear wall 17 of the cab 14, with the electrical energy storage device 58 being provided in the cab 14 and accessible via an access opening closable via the access panel.

Whilst, in this first embodiment, the electrical energy storage device 58 is located within the cab 14, it could also be located externally to the cab, for instance attached to an external wall, within the refrigerated compartment itself, or could be located in any other position on or in the vehicle.

Associated with the electrical energy storage device 58 is a charger 68, typically a charge separator drawing electricity from the vehicle battery pack 50. The charger 68 is associated with a controller 70, typically a combi-inverter/charger, which is capable of monitoring a charge status of the electrical energy storage device 58. The controller 70 may also be in communication with the vehicle battery pack 50 and capable of monitoring a charge status thereof.

Affixed at a front end 72 of the refrigerator compartment 16, positioned above a top face 74 of the cab 14, is a refrigeration unit 76. The refrigeration unit 76 provides cooled air to the refrigerator compartment 16 through at least one vent 78 in the front end 72 of the compartment 16 and/or one or more ducts, the ducting being able to supply the discharge cooled air of differing temperatures to the individual compartments, for instance, the cooled and frozen compartments 26, 28, of the refrigerator compartment 16 from the refrigeration unit 76.

The refrigeration unit 76 is in electrical communication with at least the electrical energy storage device 58, and preferably also the vehicle battery pack 50. The electrical power provided from either the electrical energy storage device 58 or the vehicle battery pack 50 is used to cool the surrounding air which is then discharged into the refrigerator compartment 16.

Figure 3:
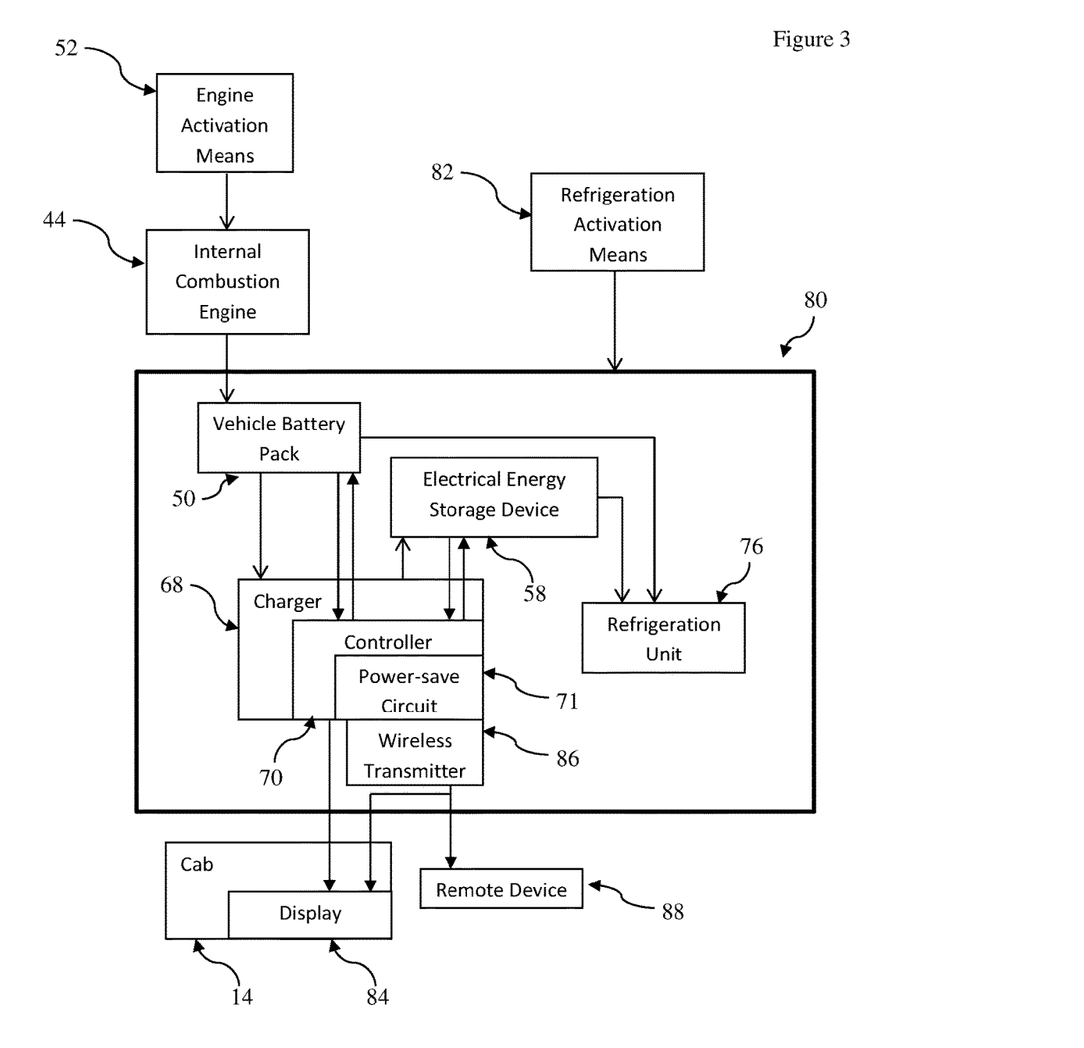
FIG. 3 is a diagrammatic representation of the refrigerator system of the commercial refrigerator vehicle.

Together, the electrical energy storage device 58, the vehicle battery pack 50, the charger 68 and the refrigeration unit 76 make up the refrigerator system 80 of the vehicle 10, and this being illustrated in FIG. 3. This refrigerator system will have a separate further activation means 82, separate of the activation means 52 of the internal combustion engine 44.

Within the cab 14, there may further be provided a display unit 84 which is in communication with the controller 70, thereby being capable of displaying the charge status of at least the electrical energy storage device 58, and therefore a remaining charge period of the electrical energy storage device 58 to the driver. The display unit 84 may be directly wired to the controller 70, or there may be provided a wireless transmitter 86 associated with the controller 70 capable of transmitting charge status information. The display unit 84 may also display other relevant information, such as the temperatures of the chilled and frozen compartments 26, 28.

The controller may be integrally formed with the charger, but could alternatively be formed separately to, whilst still being in electrical communication with, said charger.

The wireless transmitter 86 may also be in communication with a remote device 88, for instance a smart-phone or other wireless mobile telecommunications device, enabling the driver to see the charge status of the electrical energy storage device 58 whilst absented from the vehicle 10. The remote device 88 may have a software-enabled signal receiving device for displaying a remaining period of charge of the electrical energy storage device 58 on a screen of the remote device 88 to achieve this end.

In this current embodiment, the vehicle 10 is preferably a grocery van, being approximately 3.5 tonnes in weight and used for transporting chilled foodstuffs to residential locations. A typical journey will involve the driver taking the vehicle 10 to a grocery depot in order to load the refrigerator compartment 16, before driving the vehicle 10 to multiple residential locations in order to deliver the goods.

At each residential location, the vehicle 10 will be stationary, and therefore the driver would preferably switch off the internal combustion engine 44 to conserve fuel. In present known refrigerator vehicles, this leaves the driver with the choice of either switching off the internal combustion engine, thereby disabling the engine-driven refrigeration unit, or leaving the internal combustion engine running constantly.

Whilst the vehicle 10 according to the present invention is in use, the refrigeration unit 76 will be in electrical communication with the electrical energy storage device 58 and vehicle battery pack 50, but will be preferentially powered initially via the electrical energy storage device 58. Due to the electrical energy storage device 58 being a single battery cell 60 in the present embodiment, it does not require the internal combustion engine 44 to be running in order to power the refrigeration unit 76.

At the start of a day, the driver would typically charge the electrical energy storage device 58 via the access point 62 from a mains supply. The driver can then drive the vehicle 10 to a depot or warehouse to collect his first batch of goods to be delivered. During this time, the refrigeration unit 76 will be drawing power from the electrical energy storage device 58 to chill the refrigerator compartment 16, and the internal combustion engine 44 will be supplying the motive power to the wheels 46 of the vehicle 10.

At a first delivery destination, the driver stops the vehicle 10 and can turn off the internal combustion engine 44 via the engine activation means 52. The electrical energy storage device 58 is independent of the activation status of the internal combustion engine 44, and thereby the refrigeration unit 76 will continue to draw power from the electrical energy storage device 58. However, deactivation of the internal combustion engine 44 will send a signal to the controller 70 to disable the electrical communication between the refrigeration unit 76 and the vehicle battery pack 50, to prevent accidental draining of the vehicle battery pack 50, which could prevent the internal combustion engine 44 from being restarted.

The driver may then make as many deliveries as required, by following the procedure detailed above. This will lead to greatly reduced fuel consumption, as the internal combustion engine 44 will not be consuming fuel whilst the vehicle 10 is stationary.

During this time, the charge status of the electrical energy storage device 58 is being monitored by the controller 70. This charge status may be relayed to a display unit 84 in the cab 14 for the attention of the driver, or, if installed with a wireless transmitter 86, the charge status may be relayed to a remote device 88, such as a smart-phone. This remote device 88 may be installed with an application to alert the driver to the period of charge remaining within the electrical energy storage device 58, therefore informing the driver as to whether he is required to return to the vehicle 10 earlier than expected due to the depletion of the electrical energy storage device 58. The information relayed may be any of: energy consumption, remaining charge or charging time of the electrical energy storage device 58 to the driver of the vehicle 10.

If the electrical energy storage device 58 has spent its energy supply more quickly than anticipated, the controller 70 may be able to disconnect the electrical communication between the electrical energy storage device 58 and the refrigeration unit 76, and reconnect the electrical communication between the vehicle battery pack 50 and the refrigeration unit 76. The controller 70 may do this if the remaining charge of the electrical energy storage device 58 drops to a predetermined threshold, which may be zero charge remaining. This ensures that the refrigeration unit 76 continues to provide cooled air to the refrigerator compartment 16 of the vehicle 10, even if the electrical energy storage device 58 becomes depleted.

If the refrigeration unit 76 is required to be powered by the vehicle battery pack 50, the vehicle battery pack 50 may too become depleted. Since the vehicle battery pack 50 is required to start the internal combustion engine 44, this is undesirable. Therefore, the controller 70 preferably monitors the charge status of the vehicle battery pack 50, and is capable of disconnecting the electrical communication between the vehicle battery pack 50 and the refrigeration unit 76 if the charge of the vehicle battery pack 50 falls below a predetermined threshold. In this situation, the controller 70 may either switch over to powering the refrigeration unit 76 from the electrical energy storage device 58, or, if the electrical energy storage device 58 is fully depleted, deactivate the refrigeration unit 76.

Regardless of the charge status of the electrical energy storage device 58, if the internal combustion engine 44 of the vehicle 10 is active, then the electrical energy storage device 58 can be recharged via the charger 68. Typically this involves drawing excess electrical energy generated from the alternator 48 during normal operation of the internal combustion engine 44. Therefore, if the driver of the vehicle 10 is alerted to the depletion of the electrical energy storage device 58 whilst delivering, he is able to return to the vehicle 10 and utilise the internal combustion engine 44 for a short-term boost in the charge of the electrical energy storage device 58, and therefore continue to power the refrigeration unit 76.

The controller 70 of the electrical energy storage device 58 may also have a 'power-save' circuit 71, whereby the refrigerator system 80 is temperature-independently deactivated and reactivated during a normal activation period, utilising a residual cooling effect within the refrigerator system and the thermally insulated compartments to substantially maintain a required interior temperature. Since the refrigerator compartment 16 of the vehicle 10 is thermally insulated, the refrigeration unit 76 does not necessarily have to be permanently operational in order to maintain temperature. To reduce energy consumption therefore, the 'power-save' circuit 71 may intermittently disrupt the electrical communication between the electrical energy storage device 58 and the refrigeration unit 76. Alternatively, a 'power-save' mode could be automatically dependent upon a temperature registered in the refrigerator compartment 16.

It will be appreciated that the embodiment as described above relates specifically to, and to the operation of, a refrigerated grocery van. Such a van has a single rigid wheeled chassis 12 to which is mounted both the cab 14 and the refrigerator compartment 16. It will be appreciated that the invention relates to the means of powering the refrigerator system 80, and given that there are many types of refrigerator vehicle, the present invention is equally applicable to all variants.

Another vehicle of note would be an articulated refrigerator vehicle 110, depicted in FIG. 4 as a second embodiment of the invention, having a tractor unit 190 and a trailer unit 192. Parts which are similar to those of the first embodiment have a reference with '100' added, and therefore further detailed description is omitted.

In such a vehicle 110, the refrigerator system 180 would be split between the tractor unit 190 and trailer unit 192, the refrigeration unit 176 being installed on the trailer unit 192, whilst the remaining components, being the electrical energy storage device 158, the charger 168, the vehicle battery pack 150, are installed in the tractor unit 102.

Since the refrigerator compartment 116 of the trailer unit 192 is likely to be considerably larger than that of the van 10, the refrigeration unit 176 is likely to consume considerably more power than the corresponding unit 76. As such, the electrical energy storage device 158 in this instance may comprise a bank of batteries 194, thereby providing a greater energy storage capacity.

This bank of batteries 194 will typically take up a much greater volume than the single battery cell 60, and thus it may be preferable to replace the passenger seat in the tractor unit 190 with the bank of batteries 194 rather than losing valuable storage space within the refrigerator compartment 116.

When a bank of batteries 194 is installed, the controller 170 may selectively and dynamically choose which of the individual batteries 160 should be used at any given time to provide power to the refrigeration unit 176. The controller 170 does this by monitoring the individual charge status of each individual battery 160. Initially, the controller will choose the battery cell or cells 160 with the greatest remaining charge to power the refrigeration unit 176. The charger 168 is then able to charge the remaining battery cells 160, should the internal combustion engine 144 be active. The controller 170 may then choose to switch which battery cell or cells 160 is/are providing the electrical power to the refrigeration unit 168 as the initial battery cell or cells 160 become depleted.

It will be appreciated that the embodiments described above are only two ways in which the present invention may be implemented. Evidently, whilst the above embodiments make reference to a grocery delivery van, any type of goods which require chilling or freezing, for example, pharmaceuticals or medical samples could also be transported.

For instance, any type of electrical energy storage device may be inserted into the chassis of the vehicle. This could extend to any number of batteries in parallel, or any type of electrical storage means, provided it is independent of the internal combustion engine. Additionally, whilst the access point for the electrical energy storage device is described as being through the passenger door, it could alternatively be underneath or to the rear of the cab.

The refrigerator compartment will also likely only have a single chilled section, or a chilled compartment and a frozen compartment, but these are not the only possible configurations of the refrigerator compartment. Any number of refrigerator compartments could be provided, at any number of temperatures, and therefore there are too many configurations to be exhaustively listed here. It is also clear that although a cuboidal refrigerator compartment is the simplest compartment to construct, other shapes of compartment are possible.

In summary, there is provided a commercial refrigerator vehicle for the transport of refrigerated produce, the commercial refrigerator vehicle comprising a wheeled chassis, a cab mounted on the wheeled chassis, an internal combustion engine having an output for driving one or more wheels of the wheeled chassis, a refrigerator compartment on the wheeled chassis for the storage of produce to be refrigerated, and a refrigerator system for controlling interior temperature of the refrigerator compartment.

The refrigerator system includes a refrigeration unit for discharging refrigerated air into the refrigerator compartment, a dedicated rechargeable electrical energy storage device housed in the cab for supplying electrical energy to the refrigeration unit, a vehicle battery pack chargeable directly or indirectly via the internal combustion engine, and a charger for charging the dedicated rechargeable electrical energy storage device via the vehicle battery pack, the charger including a controller for monitoring an activation status of the internal combustion engine and electrically disconnecting the vehicle battery pack from the dedicated rechargeable electrical energy storage device when the internal combustion engine is deactivated.

Using such a vehicle having such a refrigerator system allows a driver to turn off the main engine of the vehicle when making deliveries, without needing to worry about the refrigerator system deactivating. The driver can be alerted to the charge depletion within the electrical energy storage device via a smartphone application if necessary. The result is a reduction in fuel consumption of the vehicle, thereby reducing the cost and waste gas emission of the vehicle.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A commercial refrigerator vehicle for the transport of refrigerated produce, the commercial refrigerator vehicle comprising:
a wheeled chassis,
a cab mounted on the wheeled chassis,
an internal combustion engine having an output which drives one or more wheels of the wheeled chassis,
a refrigerator compartment on the wheeled chassis in which produce to be refrigerated is storable, and
a refrigerator system which controls interior temperature of the refrigerator compartment,
the refrigerator system including a refrigeration unit which discharges refrigerated air into the refrigerator compartment,
a dedicated rechargeable electrical energy storage device which supplies electrical energy to the refrigerator system,
a vehicle battery pack chargeable directly or indirectly via the internal combustion engine,
a charger which charges the dedicated rechargeable electrical energy storage device via the vehicle battery pack,
and a controller which monitors an activation status of the internal combustion engine and electrically disconnecting the vehicle battery pack from the dedicated rechargeable electrical energy storage device when the internal combustion engine is deactivated;
wherein the refrigeration unit is electrically connected to the vehicle battery pack, a supply of electrical energy to the refrigeration unit being provided by the rechargeable electrical energy storage device or the vehicle battery pack, the refrigeration unit being supplied with electrical energy by the dedicated rechargeable electrical energy storage device at least during a deactivation condition of the internal combustion engine; and
wherein the electrical energy storage device is positioned adjacent a seat for the driver when driving the vehicle in place of a passenger seat of the cab.

2. The commercial refrigerator vehicle as claimed in claim 1, wherein access to the electrical energy storage device is provided through a cab door of a passenger side of the cab.

3. The commercial refrigerator vehicle as claimed in claim 1, wherein the cab includes an access panel in a rear wall of the cab, the electrical energy storage device being provided in the cab and accessible via an access opening closable by the access panel.

4. The commercial refrigerator vehicle as claimed in claim 1, wherein the controller further monitors a charge status of the electrical energy storage device.

5. A commercial refrigerator vehicle as claimed in claim 4, wherein the controller enables the vehicle battery pack to supplementarily drive the refrigeration unit if the monitored charge status of the electrical energy storage device is below a predetermined threshold.

6. The commercial refrigerator vehicle as claimed in claim 5, wherein the controller further monitors a charge status of the vehicle battery pack.

7. The commercial refrigerator vehicle as claimed in claim 6, wherein the controller prevents or inhibits the vehicle battery pack from driving the refrigeration unit if the charge status of the vehicle battery pack falls below a predetermined threshold determined to be required to start the internal combustion engine.

8. The commercial refrigerator vehicle as claimed in claim 4, wherein the controller further includes a charge alert module which outputs a charge alert signal, and a wireless transmitter which outputs the charge alert signal to a remote receiver device.

9. The commercial refrigerator vehicle as claimed in claim 1, wherein the controller includes a power-save circuit for temperature-independently deactivates and reactivates the refrigerator system during an activation period of the refrigerator system to reduce power consumption whilst utilising residual cooling.

10. The commercial refrigerator vehicle as claimed in claim 1, wherein the electrical energy storage device comprises a plurality of rechargeable battery cells, configured such that at least said one battery cell energises the refrigeration unit, whilst the or each remaining battery cell is charged.

11. The commercial refrigerator vehicle as claimed in claim 1, wherein the electrical energy storage device is supplementarily chargeable using a mains electricity supply, the electrical energy storage device including an electrical connector engagable with an external power cable electrically communicable with the mains electricity supply.

* * * * *